(12) United States Patent
Saito et al.

(10) Patent No.: US 11,209,900 B2
(45) Date of Patent: Dec. 28, 2021

(54) INFORMATION PROCESSING DEVICE AND INFORMATION PROCESSING METHOD

(71) Applicant: SONY CORPORATION, Tokyo (JP)

(72) Inventors: Mari Saito, Kanagawa (JP); Kenji Sugihara, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 16/489,839

(22) PCT Filed: Feb. 16, 2018

(86) PCT No.: PCT/JP2018/005517
§ 371 (c)(1),
(2) Date: Aug. 29, 2019

(87) PCT Pub. No.: WO2018/186031
PCT Pub. Date: Oct. 11, 2018

(65) Prior Publication Data
US 2020/0033942 A1    Jan. 30, 2020

(30) Foreign Application Priority Data
Apr. 3, 2017 (JP) .............................. JP2017-073448

(51) Int. Cl.
*G06F 3/01*  (2006.01)
*G06F 3/16*  (2006.01)
(Continued)

(52) U.S. Cl.
CPC .............. *G06F 3/013* (2013.01); *G06F 3/017* (2013.01); *G06F 3/167* (2013.01); *G09G 5/08* (2013.01);
(Continued)

(58) Field of Classification Search
CPC ................................ G06F 3/013; G06F 3/0483
(Continued)

(56) References Cited

U.S. PATENT DOCUMENTS 6,157,367 A * 12/2000 Van Der Haar .... G06F 3/04812
715/856
6,241,609 B1 * 6/2001 Rutgers ................... A63F 13/12
463/31
(Continued)

FOREIGN PATENT DOCUMENTS

CN    101297259 A    10/2008
CN    106464959 A    2/2017
(Continued)

OTHER PUBLICATIONS

Machine Translation of WO 2016/151958, published Sep. 29, 2016, 22 pages (Year: 2016).*

(Continued)

*Primary Examiner* — Daniel Rodriguez
(74) *Attorney, Agent, or Firm* — Chip Law Group

(57) ABSTRACT

An information processing device according to an embodiment of the present technology includes a line-of-sight-information acquisition unit, an input-information acquisition unit, and a position presentation unit. The line-of-sight-information acquisition unit acquires first line-of-sight information that indicates a gaze position of a first user with respect to a specified object. The input-information acquisition unit acquires specified input information regarding an input performed by at least one of the first user or a second user. The position presentation unit controls, on the basis of the specified input information, an information providing device to perform a position presentation control for presenting, to the second user, the gaze position of the first user in an invisible state.

19 Claims, 10 Drawing Sheets

(51) Int. Cl.
*G09G 5/08* (2006.01)
*G06F 3/0483* (2013.01)

(52) U.S. Cl.
CPC ....... *G06F 3/0483* (2013.01); *G09G 2354/00* (2013.01)

(58) Field of Classification Search
USPC .......................................................... 715/716
See application file for complete search history.

(56) References Cited

U.S. PATENT DOCUMENTS

| | | | | |
|---|---|---|---|---|
| 7,727,060 | B2* | 6/2010 | Mills | G07F 17/32 463/13 |
| 8,913,004 | B1* | 12/2014 | Bozarth | G09G 5/006 345/156 |
| 9,300,916 | B1* | 3/2016 | Breedvelt-Schouten | H04N 7/147 |
| 9,451,210 | B1* | 9/2016 | Smus | G06F 3/04842 |
| 9,749,582 | B2* | 8/2017 | Jeong | H04N 7/147 |
| 9,841,814 | B1* | 12/2017 | Kallmeyer | G06F 3/167 |
| 10,466,474 | B2* | 11/2019 | Lection | G02B 27/0093 |
| 2007/0186171 | A1* | 8/2007 | Junuzovic | G06Q 10/10 715/751 |
| 2009/0125849 | A1 | 5/2009 | Bouvin et al. | |
| 2011/0267422 | A1* | 11/2011 | Garcia | H04N 7/15 348/14.16 |
| 2012/0300061 | A1* | 11/2012 | Osman | G06F 3/013 348/135 |
| 2013/0135196 | A1* | 5/2013 | Park | G06F 3/012 345/156 |
| 2013/0188021 | A1* | 7/2013 | Sim | G06T 15/00 348/46 |
| 2014/0118354 | A1* | 5/2014 | Pais | G09G 5/373 345/428 |
| 2014/0184550 | A1* | 7/2014 | Hennessey | G06F 3/013 345/173 |
| 2015/0235346 | A1* | 8/2015 | Kim | G09G 5/363 345/649 |
| 2015/0331485 | A1* | 11/2015 | Wilairat | G02B 27/0093 345/156 |
| 2015/0338914 | A1* | 11/2015 | Andrysco | G06F 3/013 345/173 |
| 2015/0341400 | A1* | 11/2015 | Vong | G06F 3/013 715/753 |
| 2015/0364140 | A1* | 12/2015 | Thorn | G06F 3/013 704/235 |
| 2015/0370323 | A1* | 12/2015 | Cieplinski | G06F 3/013 345/156 |
| 2016/0018888 | A1* | 1/2016 | Buford | G06F 3/013 345/156 |
| 2016/0042554 | A1* | 2/2016 | Ogan | G06F 3/04815 345/419 |
| 2016/0077585 | A1* | 3/2016 | Mizuhara | G06F 3/04842 345/157 |
| 2016/0147298 | A1* | 5/2016 | Flawn | G06F 3/0483 715/776 |
| 2016/0283455 | A1* | 9/2016 | Mardanbegi | G10L 15/26 |
| 2016/0371886 | A1* | 12/2016 | Thompson | G06F 3/013 |
| 2017/0041596 | A1* | 2/2017 | Park | G02B 30/27 |
| 2017/0061694 | A1* | 3/2017 | Giraldi | G06F 3/013 |
| 2017/0127011 | A1* | 5/2017 | Okajima | H04N 21/4223 |
| 2017/0169658 | A1* | 6/2017 | Froy | G07F 17/3211 |
| 2017/0277256 | A1* | 9/2017 | Burns | G02B 27/0093 |
| 2017/0285742 | A1* | 10/2017 | Marggraff | G06F 3/013 |
| 2018/0075656 | A1* | 3/2018 | Kim | G06F 3/011 |
| 2018/0288477 | A1* | 10/2018 | Gupta | H04N 21/434 |
| 2018/0307310 | A1* | 10/2018 | McCombe | H04N 13/243 |
| 2019/0346678 | A1* | 11/2019 | Nocham | H04W 4/029 |

FOREIGN PATENT DOCUMENTS

| | | | |
|---|---|---|---|
| EP | 1943583 A2 | 7/2008 | |
| JP | 2004-246398 A | 9/2004 | |
| JP | 2006-107281 A | 4/2006 | |
| JP | 2009-514090 A | 4/2009 | |
| JP | 2015057471 * | 5/2015 | .......... G06F 3/0484 |
| JP | 2015-138426 A | 7/2015 | |
| JP | 2016-103109 A | 6/2016 | |
| SE | 529156 C2 | 5/2007 | |
| WO | 2007/050029 A2 | 5/2007 | |
| WO | 2015/190093 A1 | 12/2015 | |
| WO | 2016/151958 A1 | 9/2016 | |

OTHER PUBLICATIONS

Bruce H. Thomas, "A survey of visual, mixed, and augmented reality gaming", ACM Computers in Entertainment, vol. 10, No. 3, Article 3, Publication date: Nov. 2012. (Year: 2012).*

International Search Report and Written Opinion of PCT Application No. PCT/JP2018/005517, dated Apr. 10, 2018, 11 pages of ISRWO.

* cited by examiner

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2018/005517 filed on Feb. 16, 2018, which claims priority benefit of Japanese Patent Application No. JP 2017-073448 filed in the Japan Patent Office on Apr. 3, 2017. Each of the above-referenced applications is hereby incorporated herein by reference in its entirety.

TECHNICAL FIELD

The present technology relates to an information processing device, an information processing method, and a program that make it possible to perform a control using information regarding a line of sight of a user.

BACKGROUND ART

Patent Literature 1 discloses a technology that estimates an intention of a user using information regarding a line of sight of the user. For example, on the basis of a feature amount of a user's line of sight with respect to a word in an electronic document, it is determined whether it is difficult for the user to understand the word. When it has been determined that it is difficult for the user to understand, a dictionary is automatically referred to regarding the word (for example, paragraphs [0001] and [0060] to [0064] in the specification of Patent Literature 1).

Patent Literature 2 discloses a technology that changes, using information regarding a line of sight of a user, a coordinate of a manipulation point to which a touch manipulation is input by a user. When the manipulation point is situated in a line-of-sight correction range centered at a gaze point that is situated at the end of the line of sight, it is determined that the gaze point has been touched, and then the coordinate of the manipulation point is changed. When the manipulation point is situated outside of the line-of-sight correction range, it is determined that a manipulation portion itself has been touched without changing the coordinate of the manipulation point (for example, paragraph [0036] in the specification and FIG. 5 of Patent Literature 2).

CITATION LIST

Patent Literature

Patent Literature 1: Japanese Patent Application Laid-open No. 2004-246398
Patent Literature 2: Japanese Patent Application Laid-open No. 2015-138426

DISCLOSURE OF INVENTION

Technical Problem

As described above, various technologies using information regarding a line of sight of a user have been developed, and, for example, there is a need for a technology that makes it possible to provide a high manipulation performance when a plurality of users performs a collaborative manipulation.

In view of the circumstances as described above, it is an object of the present technology to provide an information processing device, an information processing method, and a program that make it possible to improve a manipulation performance in a collaborative manipulation performed by a plurality of users.

Solution to Problem

In order to achieve the object described above, an information processing device according to an embodiment of the present technology includes a line-of-sight-information acquisition unit, an input-information acquisition unit, and a position presentation unit.

The line-of-sight-information acquisition unit acquires first line-of-sight information that indicates a gaze position of a first user with respect to a specified object.

The input-information acquisition unit acquires specified input information regarding an input performed by at least one of the first user or a second user.

The position presentation unit controls, on the basis of the specified input information, an information providing device to perform a position presentation control for presenting, to the second user, the gaze position of the first user in an invisible state.

In this information processing device, the gaze position of the first user in an invisible state is presented to the second user on the basis of the specified input information regarding an input performed by at least one of the first user or the second user. This results in improving a manipulation performance in a collaborative manipulation performed by the first and second users.

An information processing method according to an embodiment of the present technology is performed by a computer system, and includes acquiring first line-of-sight information that indicates a gaze position of a first user with respect to a specified object.

Specified input information regarding an input performed by at least one of the first user or a second user, is acquired.

On the basis of the specified input information, an information providing device is controlled to perform a position presentation control for presenting, to the second user, the gaze position of the first user in an invisible state.

A program according to an embodiment of the present technology causes a computer system to perform a process including:

acquiring first line-of-sight information that indicates a gaze position of a first user with respect to a specified object;

acquiring specified input information regarding an input performed by at least one of the first user or a second user; and controlling, on the basis of the specified input information, an information providing device to perform a position presentation control for presenting, to the second user, the gaze position of the first user in an invisible state.

Advantageous Effects of Invention

As described above, the present technology makes it possible to improve a manipulation performance in a collaborative manipulation performed by a plurality of users. Note that the effect described here is not necessarily limitative and may be any effect described in the present disclosure.

BRIEF DESCRIPTION OF DRAWINGS

FIG. 2 is a block diagram of an example of a functional configuration of the content providing device.

MODE(S) FOR CARRYING OUT THE INVENTION

Embodiments according to the present technology will now be described below with reference to the drawings.

[Configuration of Content Providing Device]

Figure 1:
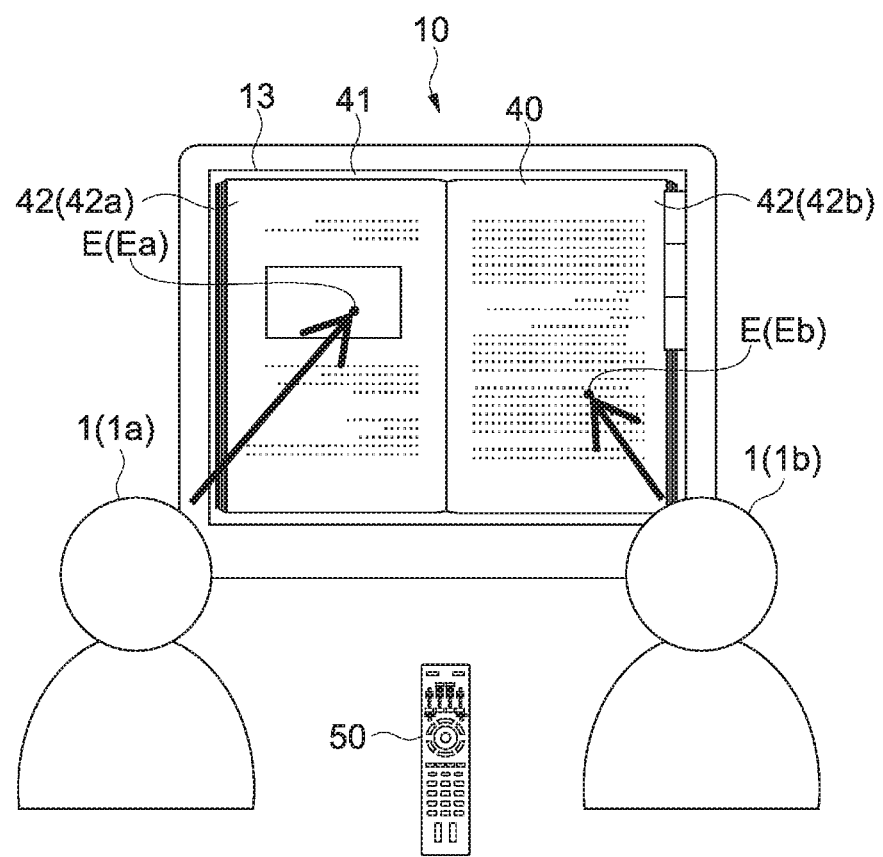
FIG. 1 schematically illustrates an appearance of a content providing device according to an embodiment.
Figure 2:
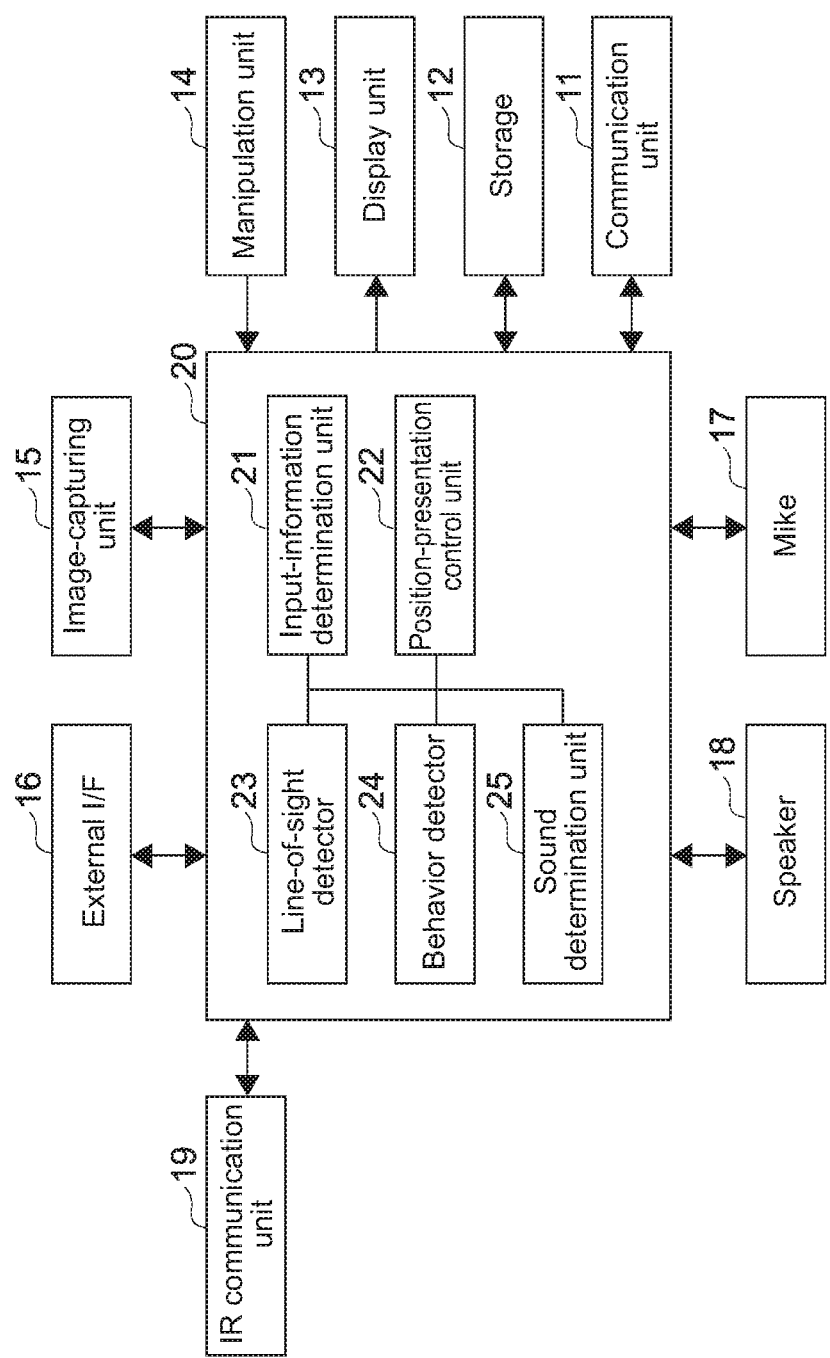
FIG. 2

FIG. 1 schematically illustrates an appearance of a content providing device according to an embodiment of the present technology. FIG. 2 is a block diagram of an example of a functional configuration of the content providing device.

The content providing device 10 is a device that provides content to a plurality of users 1. In the present embodiment, an electronic book 40 is displayed to be viewable to users 1a and 1b. FIG. 1 illustrates the electronic book 40 in which two pages 42 are both opened to be displayed as a viewing image 41 used to view the electronic book 40. As in the case of viewing a real-world book, it is possible to proceed with reading the content of the electronic book 40 by turning the pages 42.

As illustrated in FIG. 2, the content providing device 10 includes a communication unit 11, a storage 12, a display unit 13, a manipulation unit 14, an image-capturing unit 15, an external I/F (interface) 16, a mike 17, a speaker 18, an infrared (IR) communication unit 19, and a controller 20.

The communication unit 11 is a communication module used to communicate with other devices through a network such as a LAN (Local Area Network) or a WAN (Wide Area Network). A communication module for a short-range wireless communication, such as Bluetooth (registered trademark), may be provided. Further, communication equipment such as a modem or a router may be used. Content such as the electronic book 40 is downloaded to the content providing device 10, for example, through the communication unit 11.

The storage 12 is a non-volatile storage device, and examples of the storage 12 are an HDD (Hard Disk Drive), an SSD (Solid State Drive), a flash memory, and other solid-state memories.

The storage 12 stores therein a control program for controlling an operation of the entire content providing device 10, an application program for performing an information processing method according to the present technology, and various data. The method for installing, for example, the application program into the content providing device 10, is not limited. For example, the installation may be performed by an arbitrary method for performing installation through, for example, various recording media or networks.

The display unit 13 is a display device using, for example, liquid crystal or EL (Electro-Luminescence). As illustrated in FIG. 1, the electronic book 40 is displayed on the display unit 13 and viewed by the users 1a and 1b. Examples of the manipulation unit 14 are a keyboard, a pointing device, a touch panel, and other manipulation devices. When the manipulation unit 14 includes a touch panel, the touch panel may be integral with the display unit 13.

The image-capturing unit 15 is capable of capturing images of, for example, the visages, and the upper bodies or the whole bodies of the users 1a and 1b who are using the content providing device 10. For example, a digital camera provided with an image sensor such as CMOS (Complementary Metal Oxide Semiconductor) or CCD (Charge Coupled Devices), is used as the image-capturing unit 15.

The external I/F 16 is an interface used for a connection with an external device in accordance with standards such as USB and HDMI (registered trademark) (High-Definition Multimedia Interface). The mike 17 is capable of collecting sound produced by the users 1a and 1b. The speaker 18 is capable of outputting sound.

The IR communication unit 19 is a module used to perform IR communication with an external device. In the present embodiment, the content providing device 10 can be controlled by manipulating a remote controller 50 illustrated in FIG. 1. Here, an infrared command (control signal) transmitted from the remote controller 50 is received by the IR communication unit 19.

The controller 20 includes hardware, such as a CPU (Central Processing Unit), a ROM (Read Only Memory), and a RAM (Random Access Memory), that is necessary for a configuration of a computer. Various processes are performed by the CPU loading, into the RAM, a control program stored in the storage 12 and executing the control program.

The specific configuration of the controller 20 is not limited, and a device such as an FPGA (Field Programmable Gate Array), an image processing IC (Integrated Circuit), or an ASIC (Application Specific Integrated Circuit) may be used.

In the present embodiment, an input-information determination unit 21, a position-presentation control unit 22, a line-of-sight detector 23, a behavior detector 24, and a sound determination unit 25 are provided as functional blocks by the CPU of the controller 20 executing a program according to the present embodiment. Dedicated hardware may be used as appropriate in order to provide each functional block.

In the present embodiment, line-of-sight information that indicates a gaze position E of each user 1 is acquired by the content providing device 10. The line-of-sight information that indicates a gaze position E is information with which the gaze position E of each user 1 can be detected, and is typically information regarding a direction of a line of sight of each user 1. Of course, it is not limited to the information regarding a direction of a line of sight, and, for example, information regarding a gaze position E itself may be acquired.

In the present embodiment, a direction of a line of sight of each user 1 is detected by the line-of-sight detector 23 using an image of the user 1 captured using the image-capturing unit 15. Then, a gaze position E of each user 1 is detected. The line-of-sight detector 23 is capable of determining at which position on the display unit 13 the gaze position E of each user 1 exists. For example, as illustrated in FIG. 1, the line-of-sight detector 23 is capable of determining at which position on the electronic book 40 displayed on the display unit 13 a gaze position Ea of a user 1*a* and a gaze position Eb of a user 1*b* exist.

The direction of a line of sight may be detected using, for example, an image of an eyeball of each user 1, or may be detected using the orientation of the head (face) of each user 1. Further, an arbitrary algorithm may be adopted, and machine learning such as deep learning may be used. In the present embodiment, the image-capturing unit 15 and the line-of-sight detector 23 serve as a line-of-sight-information acquisition unit.

Note that the line-of-sight information that indicates a gaze position E of each user 1 may be generated by, for example, a device that is different from the content providing device 10, and the generated line-of-sight information may be transmitted to the content providing device 10 through the communication unit 11 or the external I/F 16. In this case, for example, the communication unit 11 receiving the line-of-sight information that indicates a gaze position E serves as a line-of-sight-information acquisition unit.

As described later, in the present embodiment, various position-presentation controls in which one of the users 1*a* and 1*b* is a first user and the other is a second user, are performed. Which of the users 1 is referred to as a first user (second user), is not limited, and both of the users 1*a* and 1*b* may be a first user (second user). Line-of-sight information regarding a line of sight of a user 1 referred to as a first user, is first line-of-sight information, and line-of-sight information regarding a line of sight of a user 1 referred to as a second user, is second line-of-sight information.

Note that arrows that represent line-of-sights of the respective users 1, and gaze positions E of the respective users 1 are given in FIG. 1. Regarding a basic operation of a viewing mode of the electronic book 40, a line of sight and a gaze position E are not displayed on the viewing image 41 on which the electronic book 40 is displayed, and are in an invisible state. This avoids preventing the electronic book 40 from being viewed due to, for example, a gaze position E of a user and a gaze position E of his/her counterpart being displayed. Each user 1 can proceed with reading at his/her own pace without being bothered by a gaze position E of his/her counterpart.

Further, in the present embodiment, the behavior regarding, for example, an expression, a pose, a visage (head), and the hand of each user 1 is detected by the behavior detector 24 using an image of the user 1 that is captured using the image-capturing unit 15. Then, on the basis of the detected behavior, gesture information is generated that includes a specific content of the behavior such as "hold the remote controller 50 in a hand", "touch a counterpart user 1", "two users 1 put their hands together", and "a user 1 has left his/her seat".

The gesture information can be generated by an arbitrary technology for, for example, performing a behavioral analysis using, for example, machine learning. Note that gesture information regarding a gesture of the user 1 may be generated by a device that is different from the content providing device 10, and the generated gesture information may be transmitted to the content providing device 10.

Further, in the present embodiment, sound information regarding sound due to each user 1 is generated by the sound determination unit 25 using sound collected by the mike 17. A specific content of sound produced by each user 1 can be determined using an arbitrary sound analysis technology using, for example, machine learning.

The content providing device 10 is an embodiment of an information processing device according to the present technology, and is also an embodiment of an information providing device according to the present technology. Further, the display unit 13 of the content providing device 10 corresponds to a specified object that provides specified content. Of course, the information processing device, the information providing device, and the specified object according to the present technology are not limited to being provided by a single device. The present technology is also applicable to the case in which they are provided by devices different from one another.

[Position-Presentation Control]

Figure 3:
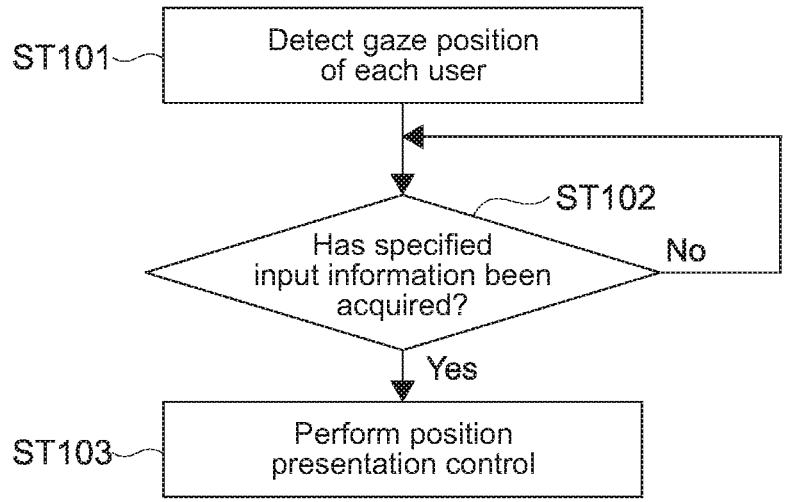
FIG. 3 is a flowchart illustrating an example of a basic operation of the content providing device.

FIG. 3 is a flowchart illustrating an example of a basic operation of the content providing device 10. First, gaze positions Ea and Eb of the users 1*a* and 1*b* are detected by the line-of-sight detector 23 (Step 101). The detection of the gaze positions Ea and Eb is constantly performed, and, for example, historical information regarding a gaze position E from a point in time in the past to the present may be temporarily stored, the point in time in the past being a point in time from which a specified period of time elapsed to the present.

The content providing device 10 monitors whether specified input information regarding an input performed by at least one of the users 1*a* and 1*b* has been acquired (Step 102). In the present embodiment, control information depending on an infrared command transmitted by each user 1 manipulating the remote controller 50, line-of-sight information regarding a line of sight of the user 1 (gaze position E), gesture information regarding a gesture of the user 1, and sound information regarding sound due to the user 1 are input to the input-information determination unit 21 as input information regarding an input performed by the user 1.

The input-information determination unit 21 determines whether the input information is predetermined input information. When a result of the determination is Yes, it is determined that specified input information has been acquired, and the process moves on to Step 103. For example, when, for example, specified control information, information including a specified movement of a gaze position, gesture information including a specified gesture, and sound information including a specified sound are input, it is determined that specified input information has been acquired. In the present embodiment, the input-information determination unit 21 serves as an input-information acquisition unit.

When the specified input information has been acquired (Yes in Step 102), the position-presentation control unit 22 performs a position presentation control (Step 103). The position presentation control is performed on the basis of the acquired input information. In the present embodiment, the position-presentation control unit 22 serves as a position presentation unit.

The position presentation control is a control for presenting a gaze-position of a first user in an invisible state to a second user. For example, when the user 1*a* illustrated in FIG. 1 is a first user and the user 1*b* illustrated in FIG. 1 is a second user, a position presentation control for presenting a gaze position Ea of the user 1*a* in an invisible state to the user 1*b*, is performed on the basis of the specified input information acquired in Step 102.

For example, when the user 1*b* is a first user and the user 1*a* is a second user, a position presentation control for presenting a gaze position Eb of the user 1*a* in an invisible state to the user 1*a*, is performed on the basis of the acquired specified input information. In other words, the position presentation control is also considered a control for presenting a gaze-position E of one user 1 in an invisible state to the other user 1.

Note that the presentation of a gaze position E is not limited to a direct presentation of a gaze position E such as displaying, for example, a pointer on the gaze position E. For example, an indirect presentation that makes it possible to know a ballpark position of a gaze position E, is also included. For example, a state in which a gaze position E exists on one of a left page 42 or a right page 42 of the electronic book 40, is presented by causing the page 42 to glare. Further, a state in which a gaze position E exists in a viewed-page indicating region 43 is presented by turning a portion of a page 42, the viewed-page indicating region 43 being a region in which the gaze position E is set in a lower-right edge portion of the display unit 13 (refer to, for example, FIG. 5). Such presentations are also included in the presentation of a gaze position E.

Further, the presentation of a gaze position E is not limited to a presentation performed by controlling a GUI (Graphical User Interface) displayed on the display unit 13, and also includes a presentation using, for example, sound. Any method may be adopted as a specific method for presenting a gaze position E.

Figure 4:
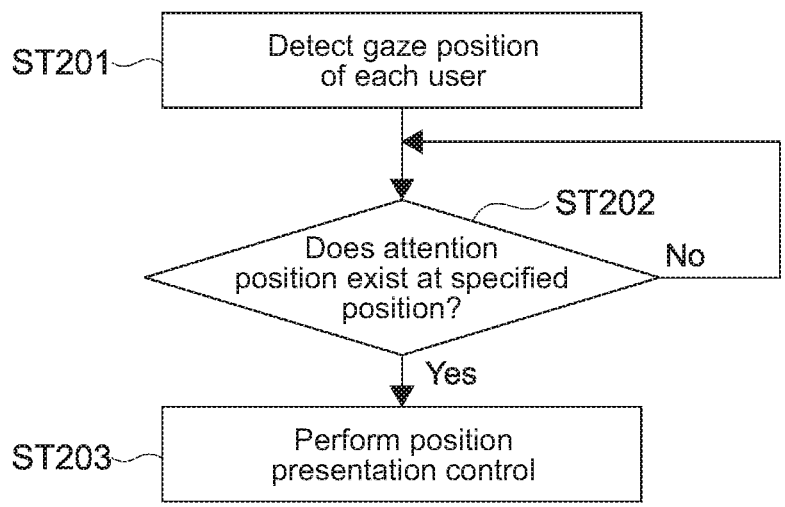
FIG. 4 is a flowchart illustrating a specific example of performing a position presentation control.
Figure 5:
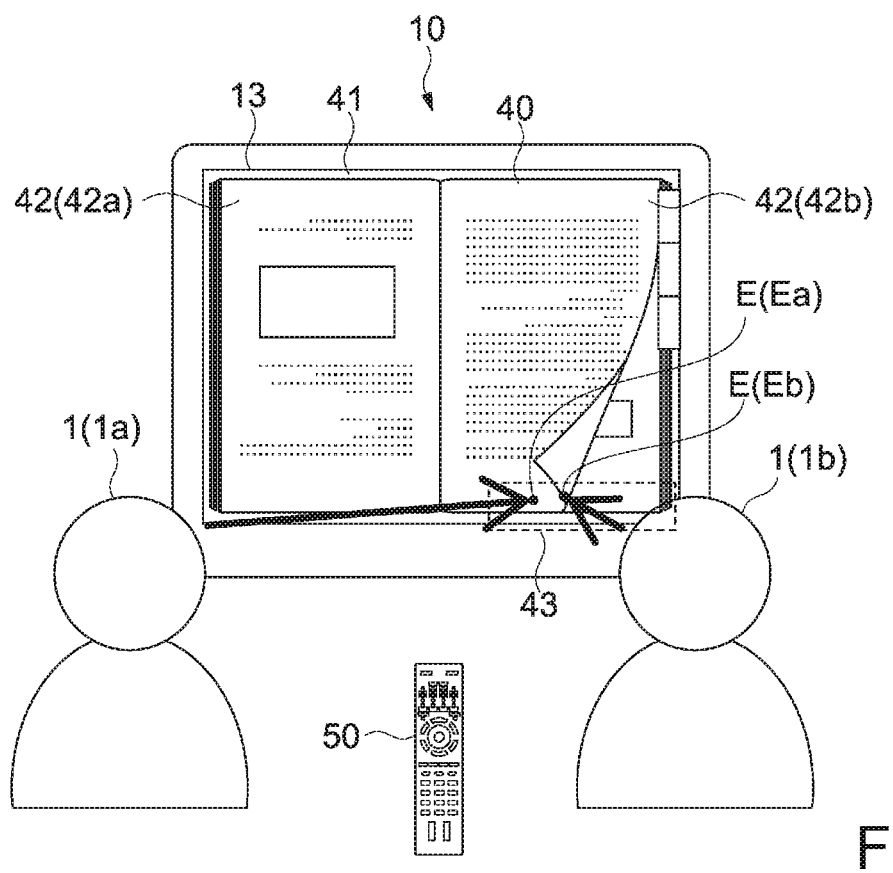
FIG. 5 is a schematic diagram illustrating an example in which the flow illustrated in FIG. 4 is performed.

FIG. 4 is a flowchart illustrating a specific example of performing a position presentation control. FIG. 5 is a schematic diagram illustrating an example in which the flow illustrated in FIG. 4 is performed. In the example illustrated in FIG. 4, it is determined whether both of or one of gaze positions Ea and Eb of the users 1*a* and 1*b* exists at a specified position (Step 202). In other words, it is determined whether input information indicating that the gaze position E of each user 1 exists at a specified position has been acquired.

For example, as illustrated in FIG. 5, the viewed-page indicating region 43 is set in a lower-right edge portion of the display unit 13 that is a specified object (the dashed line indicating the region 43 is not actually displayed). The viewed-page indicating region 43 is set, as appropriate, to be a region including a gaze position E of the user 1 when the user 1 starts reading from a left page 42*a* and finishes reading a right page 42*b*.

For example, when both of the gaze positions Ea and Eb of the users 1*a* and 1*b* exist in the viewed-page indicating region 43, it is determined to be Yes in Step 202. Then, a position presentation control for turning the page 42 and displaying the pages 42 corresponding to next two pages, is performed (Step 203).

Accordingly, the page 42 is automatically turned at a timing at which both of the users 1*a* and 1*b* finish viewing the page 42. Consequently, when the users 1*a* and 1*b* perform a collaborative manipulation to proceed with reading the same electronic book 40 while turning a page, there is no need to have agreement on whether there is no problem with turning a page. The page 42 is automatically turned at an appropriate timing at which both of the users 1*a* and 1*b* finish reading the page 42, which results in providing a very high manipulation performance.

The control for turning a page illustrated in FIG. 5 is a position presentation control for presenting, to a second user, a gaze position of a first user that exists in the viewed-page indicating region 43. Further, the control for turning a page illustrated in FIG. 5 may be a position presentation control in which the user 1*a* is a first user or a position presentation control in which the user 1*b* is a first user. The turn of a page enables the users 1*a* and 1*b* to know that their respective counterpart users 1 have also finished reading the page 42 to the lower-right edge portion of the display unit 13. Note that a page will also be automatically turned when the users 1*a* and 1*b* are not aware of the position of the viewed-page indicating region 43.

When both of the respective gaze positions Ea and Eb of the users 1*a* and 1*b* exist in the viewed-page indicating region 43, the turn of a page may be suggested by a small portion of a lower-right end of the right page 42*b* being turned. A page may be turned when an input indicating that a page is turned, is performed, or when an input indicating that the turn of a page is stopped, is not performed. This enables both of the users 1*a* and 1*b* to accurately acquire a timing at which a page is desired to be turned.

Further, a position presentation control for turning a page may be performed on the basis of input information indicating that the gaze position E has entered the viewed-page indicating region 43*a* after sequentially moving from the left page 42*a* to the right page 42*b*. This makes it possible to accurately determine that each user 1 has finished reading the page 42. Furthermore, historical information regarding a gaze position that indicates that the gaze position E has entered the viewed-page indicating region 43. For example, a position presentation control for turning a page may be performed on the basis of input information indicating that both of the gaze positions Ea and Eb have once entered the viewed-page indicating region 43. Consequently, even if a gaze position E entered the viewed-page indicating region 43 earlier than the other gaze position E, and then moved to a different region, a page will also be turned when the other gaze position E enters the viewed-page indicating region 43.

Note that the setting of the viewed-page indicating region 43 is not limited to the case of it being set in the lower-right edge portion of the display unit 13, and it may be set in another edge portion. Further, a region depending on, for example, the behavior or intention that is different from the behavior or intention regarding the completion of viewing of the page 42, may be set in an edge portion of the display unit 13. Moreover, an arbitrary position presentation control may be performed on the basis of specified input information indicating that a gaze position exists in the region set in the edge portion.

As described above, it is possible to perform a position presentation control on the basis of input information indicating that a gaze position E exists at a specified position in the display unit 13. Of course, the specified position may be set, with the electronic book 40 that is content at which each user 1 is gazing, being used as a reference.

For example, a lower end of the right page 42*b* is a position of a boundary with the pages 42 corresponding to next two pages. The content of the electronic book 40 does not advance unless a presently displayed page 42 is turned. Thus, the lower end of the right page 42*b* can be considered a discontinuation position at which the advancement of the content of the electronic book 40 is discontinued. The position presentation control for turning a page may be performed when both of the gaze positions Ea and Eb enter a region in the lower end of the right page 42b corresponding to the discontinuation position. In this case, an effect similar to the effect described above is also provided.

In the example illustrated in FIG. 5, the region corresponding to a discontinuation position of the electronic book 40 is a region substantially equal in size to the viewed-page indicating region 43 set in the lower-right edge portion of the display unit 13. For example, the discontinuation position in the lower end of the right page 42b may be a region different from a region around the display unit 13, for example, when the size of the electronic book 40 is smaller than the display unit 13. In this case, for example, a similar position presentation control can be performed by setting the discontinuation position of the right page 42b again to be the viewed-page indicating region 43.

Of course, another position in the page 42 may be set to be a discontinuation position of the electronic book 40. For example, an arbitrary position in content, such as a position at the end of a paragraph, or a chapter separation, may be set to be a discontinuation position of content.

Figure 6:
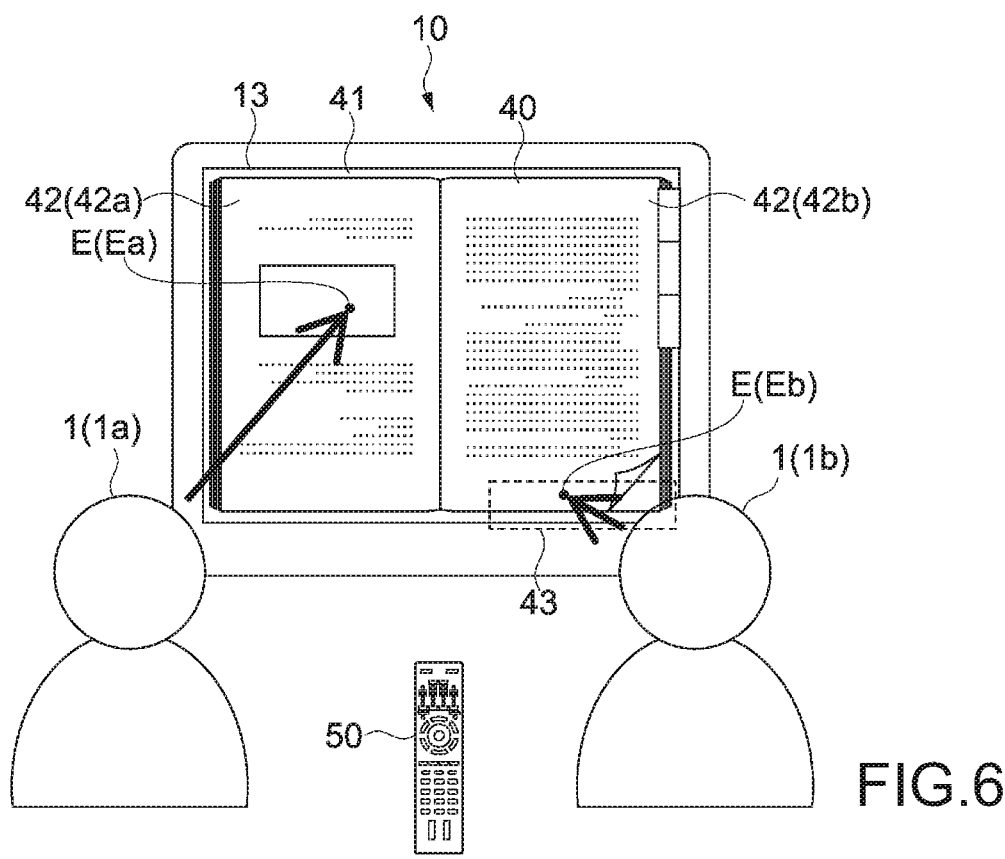
FIG. 6 is a schematic diagram illustrating another example in which the flow illustrated in FIG. 4 is performed.

In the example illustrated in FIG. 6, a position presentation control for turning a small portion of the right end of the right page 42b is performed when the gaze position E of one user 1 (user 1b) exists in the viewed-page indicating region 43 (Yes in Step 202, Step 203). This enables the other user 1 (user 1a) to know that his/her counterpart user 1 has already finished reading the page 42. On the other hand, this enables the user 1 who has finished reading the page 42 to know that his/her counterpart user 1 has not yet finished reading.

The control for turning a portion of a page illustrated in FIG. 6 is a position presentation control for presenting, to a second user (user 1a), a gaze position E of a first user (user 1b) that exists in the viewed-page indicating region 43. Note that it is assumed that a position presentation control for turning the page 42 when the gaze positions Ea and Eb enter the viewed-page indicating region 43, is performed as illustrated in FIG. 5. In this case, the control for turning a portion of a page illustrated in FIG. 6 can also be considered a position presentation control for presenting, to the second user (user 1b), a gaze position E of the first user (user 1a) that exists in a region other than the viewed-page indicating region 43.

Figure 7:
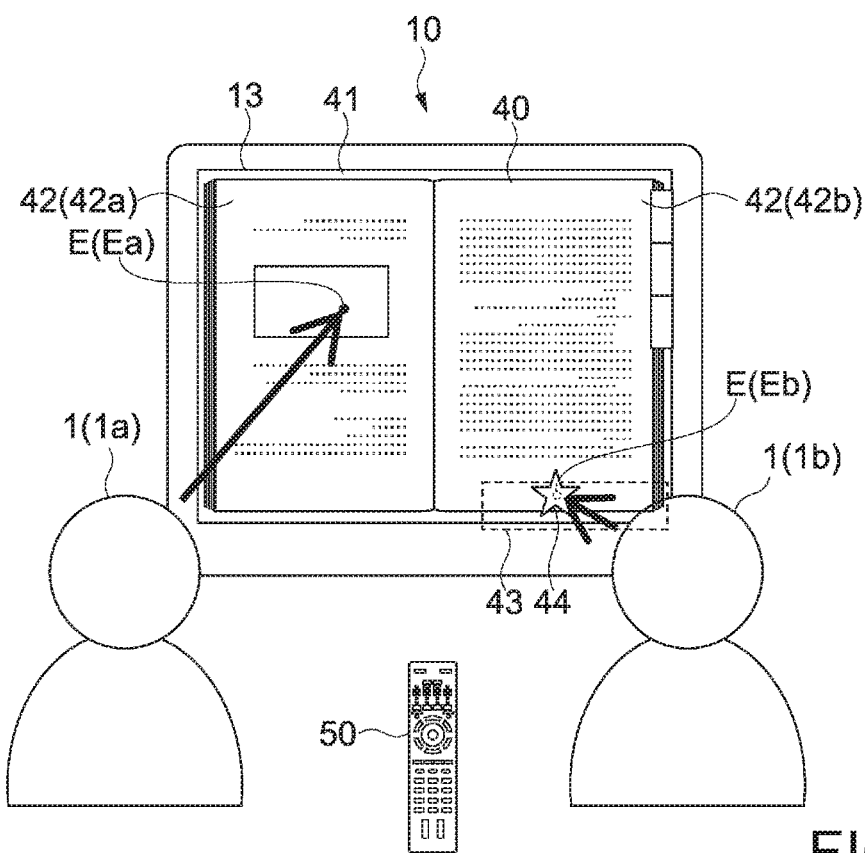
FIG. 7 is a schematic diagram illustrating yet another example in which the flow illustrated in FIG. 4 is performed.

As illustrated in FIG. 7, a position presentation control for directly displaying a gaze position E of one user 1 (user 1b) that exists in the viewed-page indicating region 43 using, for example, a pointer 44 when the gaze position E exists in the viewed-page indicating region 43, may be performed. This enables the other user 1 (user 1a) to know that his/her counterpart user 1 has already finished reading a page. On the other hand, this enables the user 1 who has finished reading the page 42 to know that his/her counterpart user 1 has not yet finished reading.

Figure 8:
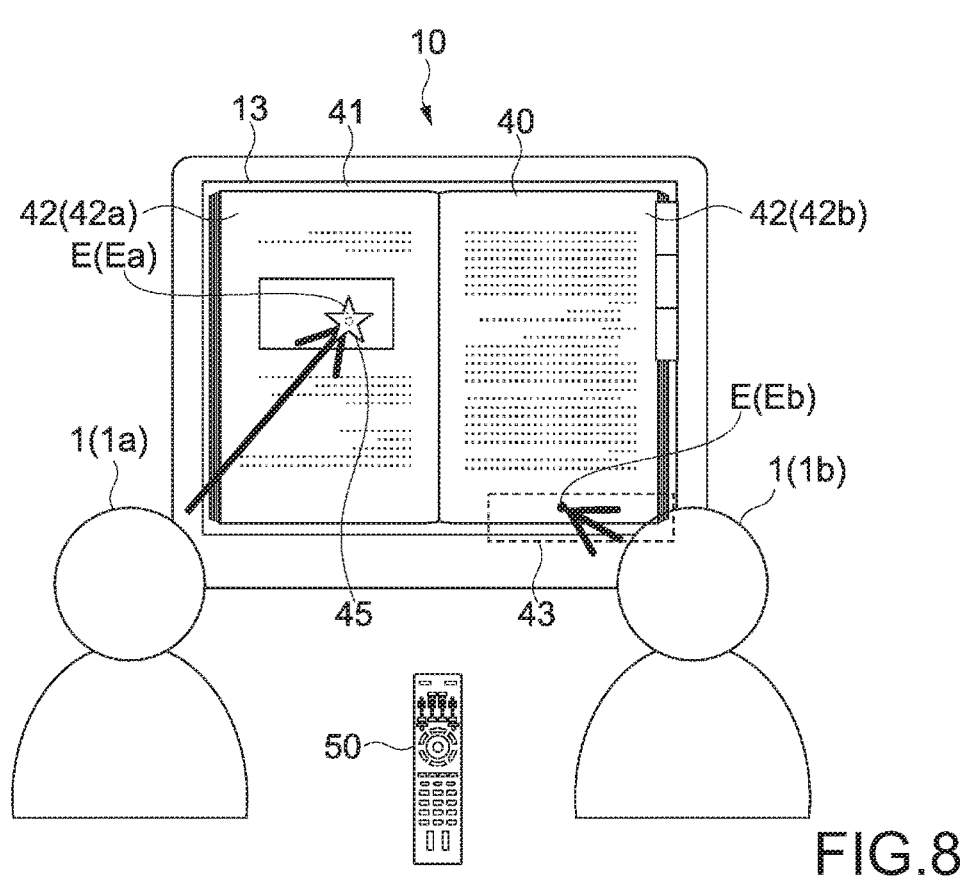
FIG. 8 is a schematic diagram illustrating yet another example in which the flow illustrated in FIG. 4 is performed.

As illustrated in FIG. 8, a position presentation control for directly displaying a gaze position E of one user 1 (user 1a) that has not yet entered the viewed-page indicating region 43 using, for example, a pointer 45 when a gaze position E of the other user 1 (user 1b) exists in the viewed-page indicating region 43, may be performed. This enables the user 1 who has finished reading the page 42 to know that his/her counterpart user 1 has not yet finished reading and to know around which portion the counterpart user 1 is reading. On the other hand, this enables the user 1 who has not yet finished reading to know that his/her counterpart user 1 has already finished reading.

As in the case of the control illustrated in FIG. 6, the controls illustrated in FIGS. 7 and 8 are also a position presentation control for presenting, to a second user (user 1a), a gaze position E of a first user (user 1b) that exists in the viewed-page indicating region 43. Further, they are also considered a position presentation control for presenting, to a second user (user 1b), a gaze position E of a first user (user 1a) that exists in a region other than the viewed-page indicating region 43.

Figure 9A:
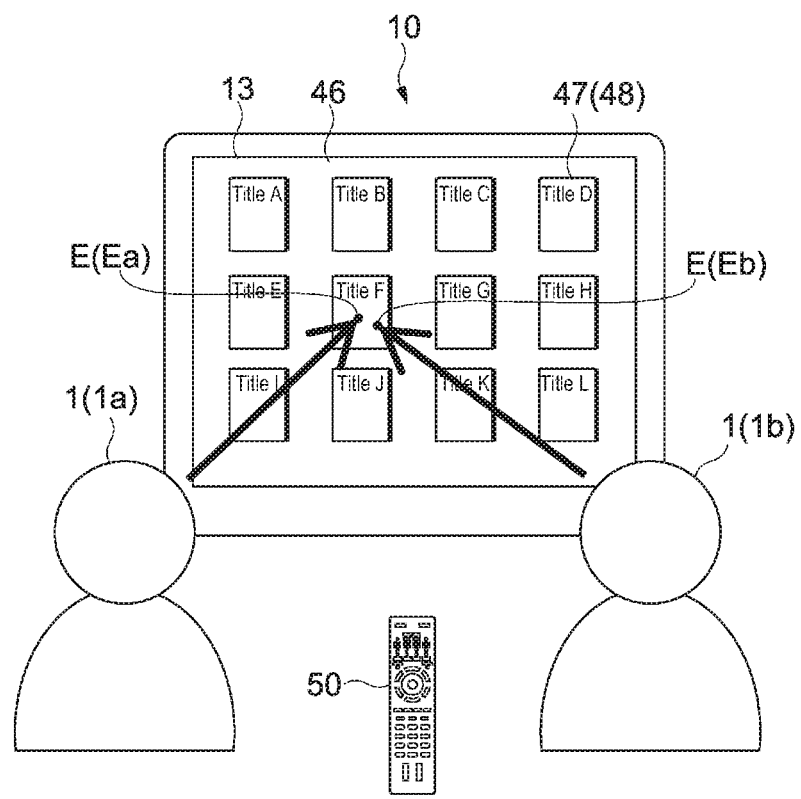
FIGS. 9A and 9B are schematic diagrams illustrating another example of the position presentation control performed on the basis of a gaze position.
Figure 9B:
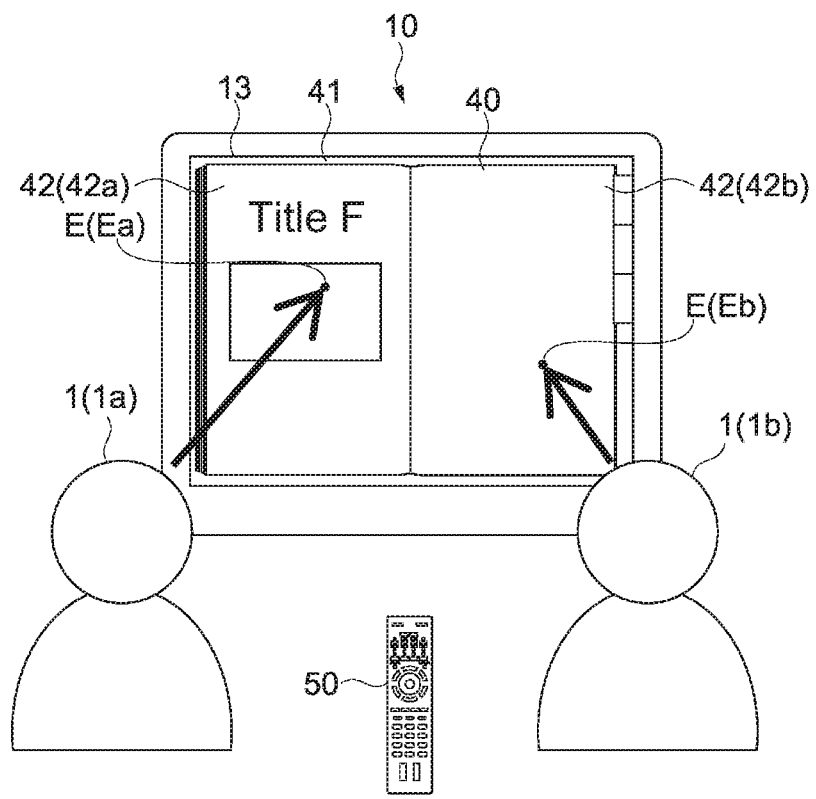

FIGS. 9A and 9B are schematic diagrams illustrating another example of the position presentation control performed on the basis of a gaze position. FIG. 9A illustrates a selection screen 46 used to select an electronic book 40 to be viewed. Icons 47 of electronic books 40 that respectively have Titles A to L are displayed on the selection screen 46. The storage 12 stores therein information regarding positions of the respective icons 47, in particular, information regarding icon regions 48 respectively occupied by the corresponding icons 47.

As illustrated in FIG. 9A, both of the gaze positions Ea, and Eb of the users 1a and 1b exist in a specified icon region 48, an electronic book 40 corresponding to an icon 47 in the icon region 48 is selected. Then, as illustrated in FIG. 9B, a position presentation control for displaying a viewing image 41 used to view the selected electronic book 40. Accordingly, when two users perform a collaborative manipulation to select an electronic book 40, an electronic book 40 that is desired by the two users will be automatically selected without the two users mutually confirming which electronic book 40 is to be desired by their counterparts. This results in providing a very high manipulation performance.

The control for selecting an electronic book 40 illustrated in FIGS. 9A and 9B are position presentation control for presenting, to a second user, a gaze position of a first user that exists in an icon region 48 of a selected electronic book 40. Further, the selection control illustrated in FIGS. 9A and 9B may be a position presentation control in which the user 1a is a first user or a position presentation control in which the user 1b is a first user. The selection of the electronic book 40 enables the users 1a and 1b to know that their counterpart users 1 have selected the same electronic book 40.

When a gaze position E of one user 1 stays in a specified icon region 48 for more than a specified period of time, the gaze position E of the one user 1, or a gaze position E of the other user 1, or both of the gaze positions of the two users 1 may be displayed. This enables the user 1 to know which electronic book 40 has been selected by his/her counterpart, or to know that the counterpart is still considering which electronic book 40 is to be selected. Of course, a gaze position E may be directly displayed using, for example, a pointer, or may be displayed, with an icon 47 at which the gaze position E is staying being emphasized.

Figure 10:
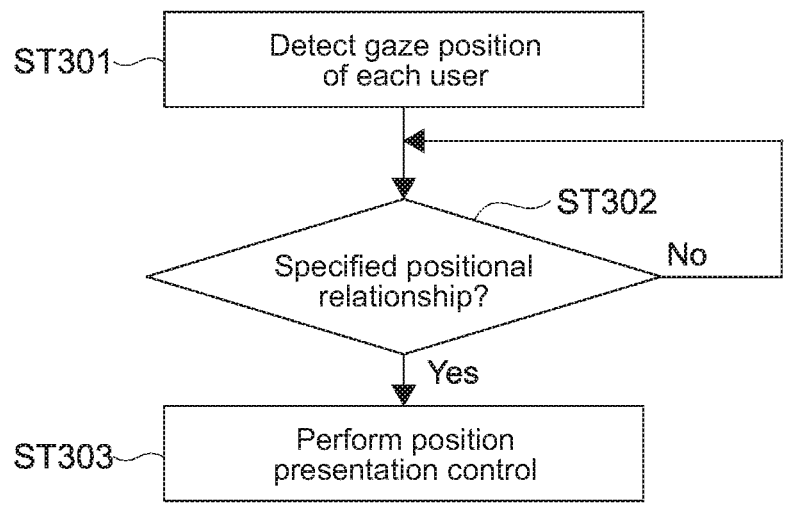
FIG. 10 is a flowchart illustrating another example of performing the position presentation control.

FIG. 10 is a flowchart illustrating another example of performing the position presentation control. As illustrated in FIG. 10, the position presentation control may be performed when the gaze positions Ea and Eb of the users 1a and 1b have a specified positional relationship with each other (Yes in Step 302, Step 303). For example, the gaze position of each user 1 is input to the input-information determination unit 21. The input-information determination unit 21 generates positional relationship information indicating a positional relationship between the gaze positions E of the respective users 1, and determines whether the generated positional relationship information is specified positional relationship information. When a result of the determination is Yes, it is determined that the specified positional relationship information has been acquired, and then the position presentation control is performed.

The gaze positions E of the users 1 respectively correspond to gaze positions of first and second users. The positional relationship information indicating a positional relationship between the gaze positions E of the respective users 1 corresponds to information regarding a positional relationship between gaze positions of the first and second users. Which of the users 1 corresponds to which of the first user and the second user, is not limited, and an arbitrary user 1 may be the first user or the second user.

A specific content of the specified positional relationship information is not limited. In other words, when the position presentation control is performed for what positional relationship the gaze positions E of the respective users 1 have with each other, is not limited. For example, the position presentation control is performed on the basis of positional relationship information indicating that the gaze positions E of the respective users 1 are associated with each other.

For example, the position presentation control may be performed on the basis of positional relationship information indicating that the gaze positions E of the respective users 1 are moving in a substantially identical direction. Alternatively, the position presentation control may be performed on the basis of positional relationship information indicating that the gaze positions E of the respective users 1 are moving substantially simultaneously.

For example, when the users 1a and 1b are reading the same text on the page 42 of the electronic book 40 in a substantially identical direction at a substantially equal rate, a position presentation control for highlighting the text to be displayed or for displaying, for example, an animation depending on the text, is performed. This enables the user 1 to know that the user 1 is reading the same portion as his/her counterpart user 1 and to enjoy reading.

Further, when the electronic book 40 such as a book of photos or a book of paintings contains a plurality of works of art and when the users 1a and 1b are sequentially viewing the same works of art at the respective same timings, a position presentation control for, for example, providing an audio indication or displaying an explanatory text related to a viewed work of art, is performed. This enables the users 1a and 1b to enjoy viewing the same work of art together. As described above, it becomes possible to not only provide a high work performance but also provide an excellent viewing experience.

Further, the position presentation control may be performed on the basis of a distance between gaze positions E of the respective users 1. For example, the position presentation control is performed on the basis of positional relationship information indicating that the distance between the gaze positions E is not greater than a specified value (threshold). For example, the position presentation control for advancing content such as turning a page is performed when the users 1a and 1b are looking at the same position in the display unit 13. The specified value may be set in a plurality of stages, and the position presentation control may be performed in stages according to the distance between gaze positions E.

For example, it is assumed that, regarding, for example, a control for selecting the content illustrated in FIGS. 9A and 9B, the content is selected when the gaze positions E of the users 1a and 1b stay in the same icon region 48 for a period of time longer than a specified value. In this case, the specified value necessary to determine a staying period of time may be controlled according to the distance between the gaze positions E in the icon region 48. For example, the specified value of a staying period of time is smaller if the gaze positions E are situated closer to each other. In other words, content is selected more quickly if the gaze positions E are situated closer to each other. Further, when the gaze positions E almost overlap, content may be selected without determining how long the staying period of time is.

Figure 11:
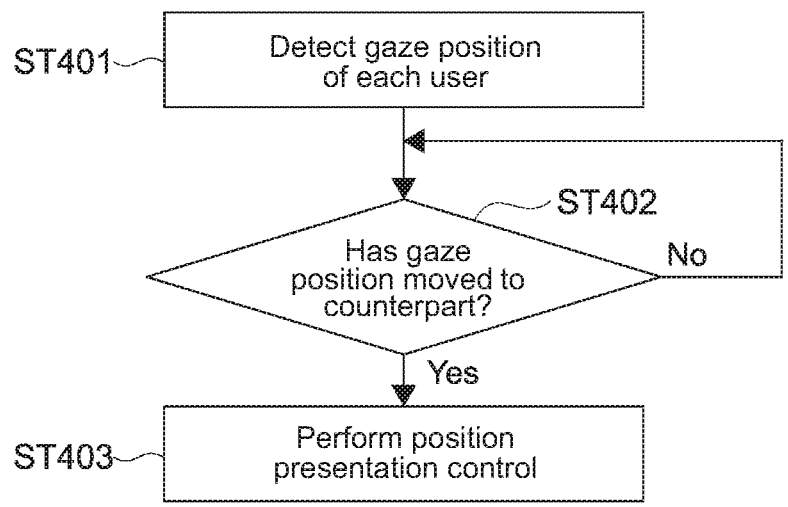
FIG. 11 is a flowchart illustrating yet another example of performing the position presentation control.

FIG. 11 is a flowchart illustrating yet another example of performing the position presentation control. As illustrated in FIG. 11, the position presentation control may be performed when input information is acquired that indicates that a gaze position E of a user 1 has moved to his/her counterpart user 1 (Yes in Step 402, Step 403).

For example, when a user 1 who gave a glance is a first user, and a user who was given the glance is a second user, a position presentation control for visualizing a gaze position E of the first user before its movement, is performed. This enables the first user to inform the second user of the gaze position of the first user (the gaze position before its movement).

Alternatively, a position presentation control for visualizing a gaze position E of a first user may be performed, with a user who was given a glance being the first user and a user who gave the glance being a second user. This enables a user to know a gaze position E of his/her counterpart by looking at the counterpart.

Figure 12:
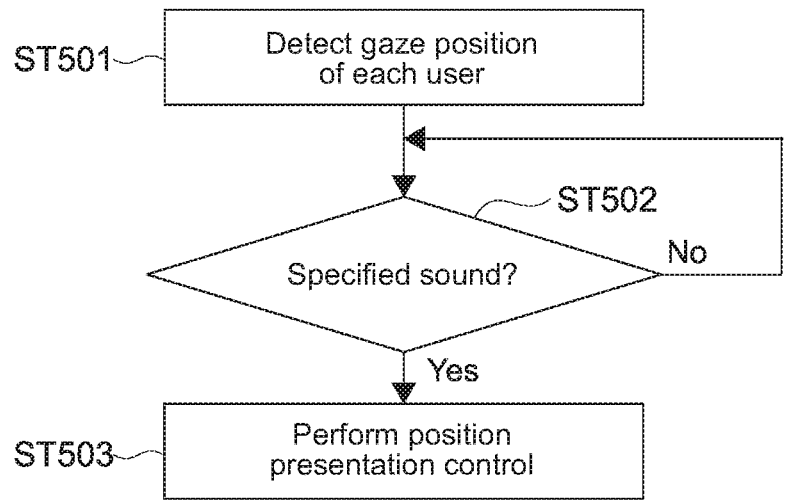
FIG. 12 is a flowchart illustrating yet another example of performing the position presentation control.

FIG. 12 is a flowchart illustrating yet another example of performing the position presentation control. As illustrated in FIG. 12, the position presentation control may be performed when a specified sound is input by at least one of the users 1 (Yes in Step 502, Step 503). In other words, when specified sound information regarding sound due to at least one of first and second users is acquired, the position presentation control may be performed on the basis of the acquired sound information.

For example, the position presentation control is performed when a sound including a demonstrative is input. For example, a gaze position E of a user 1 who uttered, for example, "this", "it", or "that", is visualized. This makes it possible to know what is indicated by the user 1. Of course, highlighting and displaying, for example, a text on which gaze positions E overlap, is also included. Further, for example, content on which gaze positions E overlap may be selected according to the demonstrative such as "this". Moreover, an arbitrary position presentation control may be performed. It is possible to further improve a manipulation performance in a collaborative manipulation by performing a control in association with sound due to the user 1.

Figure 13:
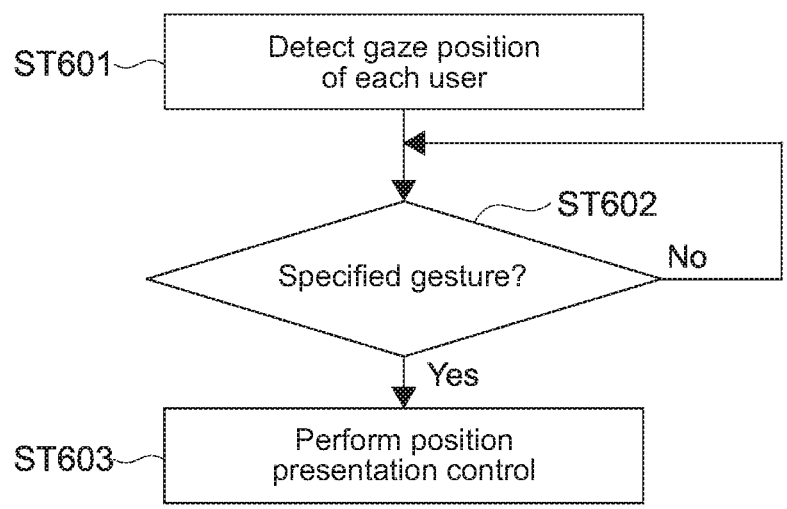
FIG. 13 is a flowchart illustrating yet another example of performing the position presentation control.

FIG. 13 is a flowchart illustrating yet another example of performing the position presentation control. As illustrated in FIG. 13, the position presentation control may be performed when a specified gesture is input by at least one of the users 1 (Yes in Step 602, Step 603). In other words, when specified gesture information regarding a gesture of at least one of first and second users is acquired, the position presentation control may be performed on the basis of the acquired gesture information.

For example, when a user 1 "holds the remote controller 50 in his/her hand", a gaze position E of the user 1 is visualized. This makes it possible to know, for example, which menu the user 1 is looking at, and to know a target of a manipulation performed using the remote controller 50. Further, when "a user 1 has left his/her seat", what the user 1 was looking at just before he/she left, is presented. Furthermore, when "two users 1 put their hands together", gaze positions E of the respective users 1 are visualized. Such arbitrary position presentation controls may be performed. It is possible to further improve a manipulation performance in a collaborative manipulation by performing a control in association with a gesture of a user.

As described above, in the content providing device 10 according to the present embodiment, a gaze position of a first user in an invisible state is presented to a second user on the basis of specified input information regarding an input performed by at least one of the first and second users. This further improves a manipulation performance in a collaborative manipulation performed by the first and second users.

For example, as described above using the examples, it is possible to have agreement on a manipulation using a gaze position E (line of sight) when a plurality of users 1 works collaboratively. For example, it is also possible to perform manipulation together while having agreement by gazing together at a device in a shared use. Specifically, for example, it is possible to have a line of sight of a counterpart to suggest a manipulable timing; to acquire the movement of a line of sight from a manipulation target to a counterpart to perform manipulation; to determine, to be a manipulation target, a target at which users gazed together; and to determine a manipulation in association with speech.

Further, it is also possible to know a counterpart's intention by performing a position presentation control. For example, it is possible to naturally understand, without having a conversation such as "Can I turn a page?", that a counterpart wishes to turn a page. For example, it is possible to perform an agreed manipulation, such as turning a page or selecting content, at a timing of, for example, finishing reading or realizing an interest in common. In other words, it is possible for each user to inform his/her counterpart of his/her intention by performing the position presentation control according to the present embodiment.

OTHER EMBODIMENTS

The present technology is not limited to the embodiment described above, and it may realize other various embodiments.

The example of displaying the electronic book 40 has been described above, but the present technology is applicable to the provision of any other content. For example, content that does not advance until a specified manipulation (including, for example, the movement of a line of sight, sound, and a reaction) is received, is referred to as still content. In other words, the still content may be considered content whose (automatic) advancement is at least partially prevented until a specified manipulation is input. The electronic book 40 described above is also included in still content since it is difficult to proceed with reading the electronic book 40 without the page 42 being turned. Note that the electronic book 40 may be considered content that does not advance in principle unless a specific manipulation is input, that is, content of which the entirety is not automatically advanced.

The present technology is also applicable to, for example, music content, video content (moving content), and, for example, an animation included in web content or the like, the music content, the video content, and the web content or the like being created as still content. The music content, the video content, and the web content or the like including, for example, an animation may be considered content that includes a portion automatically advancing and a portion not advancing unless a specified manipulation is input. For example, when specified input information regarding an input performed by the user 1, typically, input information regarding a gaze position E is acquired, a position presentation control for, for example, causing content to advance is performed. Of course, the application is not limited to this.

For example, it is assumed that, instead of the electronic book 40 being displayed, music content is played back by the content providing device 10 illustrated in FIG. 1. In other words, it is assumed that the content providing device 10 serves as a playback object according to the present technology. In Steps 102 and 103 in FIG. 3, a position presentation control is performed on the basis of input information indicating that a gaze position E of each user 1 exists on the content providing device 10. In other words, a position presentation control is performed when the user 1 looks at the content providing device 10.

For example, a position presentation control is performed on the basis of input information indicating that a gaze position E of the user 1 in a section of played-back music content, exists on the content providing device 10. In this case, the section of music content may be considered a portion in which the content does not advance until a specified manipulation is input. For example, when, for example, the end of each piece or the end of a last piece in an album is a section of music content, a next piece or a first piece in a next album is played back when the user 1 looks at the content providing device 10 at a timing at which such a section is reached. For example, a next piece is played back by all of the plurality of users 1 looking at the content providing device 10. Accordingly, there is no need to have agreement on whether to play back a next piece by, for example, having a conversation, and this results in being able to automatically play back music content according to an intention of each user 1. This results in providing a very high manipulation performance.

Note that the line-of-sight information regarding a line of sight of each user 1 corresponds to first line-of-sight information. Further, for example, a gaze position E of a user 1 that exists on the content providing device 10 is provided to another user 1 (second user) by performing a position presentation control such as playing back a next piece. Note that the present technology is also applicable to any content other than still content, and it is possible to provide a high manipulation performance.

Further, a similar process can also be performed when video content is played back. For example, when, for example, the end of each chapter of video content or the end of a video work is a section of video content, a next chapter or a next video work is played back when the user 1 looks at the content providing device 10 at a timing at which such a section is reached. Accordingly, there is no need to have agreement on whether to play back a next video work by, for example, having a conversation, and this results in being able to automatically play back video content according to an intention of each user 1. This results in providing a very high manipulation performance.

Figure 15A:
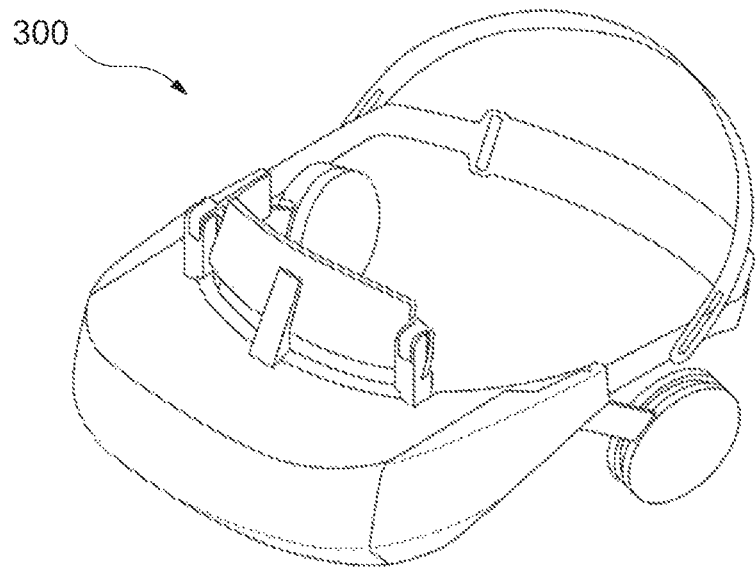
FIGS. 15A and 15B are perspective views of an example of a configuration of a head-mounted display according to the present technology.
Figure 15B:
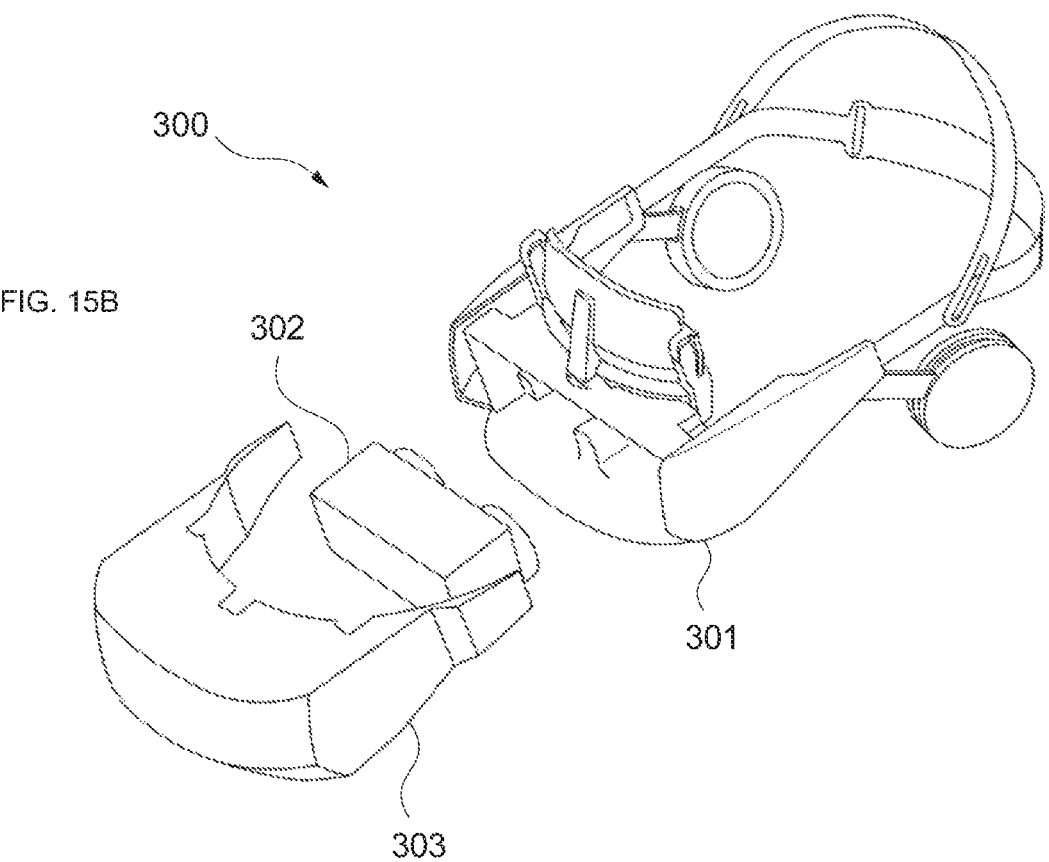

FIGS. 15A, and 15B are perspective views of examples of configurations of head-mounted displays (HMDs) that can be used as an information processing device and an information providing device according to the present technology.

An HMD 200 illustrated in FIG. 18 is an eye-glasses device provided with a transmissive display, and is used by being mounted on the head of the user 1. The HMD 200 includes left and right lenses 201L and 201R, a left-eye display 202L and a right-eye display 202R, a left-eye camera 203L and a right-eye camera 203R, and a sensor 204.

The left and right lenses 201L and 201R are respectively arranged in the front of the left eye of a user and in the front of the right eye of the user. The left-eye and right-eye displays 202L and 202R are respectively provided in the left and right lenses 201L and 201R to cover the field of view of the user 1.

The left-eye and right-eye displays 202L and 202R are transmissive displays, and, for example, a left-eye image and a right-eye image are respectively displayed on the left-eye and right-eye displays 202L and 202R. The user 1 who is wearing the HMD 200 can visually confirm the real-world scenery and an image displayed on each display at the same time. This enables the user to experience, for example, an augmented reality (AR).

Note that, for example, light control elements (not illustrated) may be provided on the outer sides of the left-eye and right-eye displays 202L and 202R (on the sides opposite to the eyes of the user 1). The light control element is an element that is capable of controlling an amount of light that is transmitted through the light control element. For example, the provision of the light control element makes it possible to perform a control on the real-world scenery transmitted through each display to be visually confirmed by a user, and to highlight an image displayed on each display to be visually confirmed by the user. This enables the user to experience, for example, a virtual reality (VR).

For example, a transmissive organic EL display or an LCD (Liquid Crystal Display, liquid crystal display element) display is used as the left-eye and right-eye displays 202L and 202R. Further, for example, light control glass, a light control sheet, or a liquid crystal shutter that is capable of electrically controlling the transmissivity, is used as a light control element.

The left-eye and right-eye cameras 203L and 203R are respectively provided in arbitrary positions from which images of the left eye and the right eye of a user can be captured. For example, line-of-sight information indicating a gaze position E is acquired on the basis of the images of the left eye and the right eye captured by the left-eye and right-eye cameras 203L and 203R.

For example, a digital camera that includes an image sensor such as a CMOS (Complementary Metal-Oxide Semiconductor) sensor or a CCD (Charge Coupled Device) sensor, is used as the left-eye and right-eye cameras 203L and 203R. Further, for example, an infrared camera equipped with an infrared illumination such as an infrared LED may be used.

Examples of the sensor 204 include, for example, an acceleration sensor, a gyroscope, and a geomagnetic sensor (nine-axis sensor), and the sensor 204 acquires information regarding the behavior of the user 1 described above, the behavior of the user 1 including a movement and a pose of the user 1 (such as running, walking, and stopping). Line-of-sight information indicating a gaze position E may be acquired on the basis of an orientation of the head (face) of the user 1 that is detected by the sensor 204. Further, a sensor that is capable of acquiring biological information of the user 1, such as a heartbeat sensor, a perspiration sensor, a temperature (body temperature) sensor, and a brain wave sensor, may be provided as the sensor 204. Moreover, a position presentation control may be performed according to the acquisition of specified input information that includes, for example, a change in biological information of the user 1.

FIG. 19A is a schematic perspective view of an appearance of an HMD 300. FIG. 19B is a schematic exploded perspective view of the HMD 300. The HMD 300 includes a mounted portion 301 that is mounted on the head of the user 1, a display unit 302 that is arranged in the front of the eyes of the user 1, and a cover 303 configured to cover the display unit 302. The HMD 300 is an immersive head-mounted display configured to cover the field of view of a user, and is used as an HMD for virtual reality (VR).

The present technology may be applied to a virtual object in a virtual space that can be experienced by wearing these HMDs 200 and 300. In other words, first line-of-sight information (second line-of-sight information) regarding a line of sight of a first user (second user) with respect to a virtual object is acquired. Then, a position presentation control for presenting, to the second user, a gaze position of the first user in the virtual space, may be performed on the basis of specified input information regarding an input performed by at least one of the first and second users. Of course, the present technology is applicable to both a real object in a real space and a virtual object in an AR space when the AR space is being experienced by wearing the HMD 200.

In a virtual space such as an AR space or a VR space, it is difficult for a user to feel a presence of his/her counterpart user who works collaboratively with the user when the user communicates with the counterpart, because the user is wearing, for example, the HMD 200. Thus, it is difficult to have agreement regarding a turn of a page or a content selection. It also becomes easy to work collaboratively in a virtual space by the position presentation control according to the present technology described above being performed, and this results in providing a high work performance.

Figure 14:
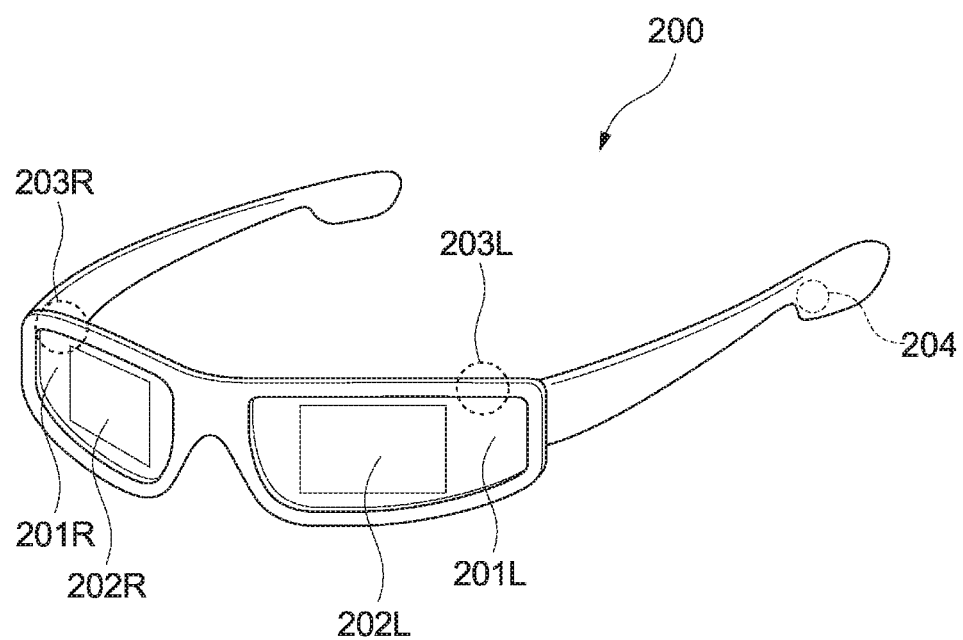
FIG. 14 is a perspective view of an example of a configuration of a head-mounted display according to the present technology.

Any device may be used as an information providing device. A device is used that has at least one of an image display function or a sound output function, such as, for example, the content providing device 10 illustrated in FIG. 1. Further, a device is used that is capable of displaying at least one of a virtual-reality image or an augmented-reality image, such as the HMD 200 and 200 illustrated in FIGS. 14 and 15. Moreover, various CE (Consumer Electronics) devices such as, for example, a TV device, a PC (Personal computer), a smartphone, a tablet terminal, an audio-video receiver, a video monitor, and a game device for home use, may be used.

The content providing device 10 illustrated in FIG. 1 serves as both the information processing device and the information providing device according to the present technology. Then, the position presentation control by the content providing device 10 is performed by the position-presentation control unit 22. The configuration is not limited to this, and the information processing device and the information providing device according to the present technology may be configured independently of each other, and may be communicatively connected to each other through, for example, a network. In this case, a position-presentation control unit of the information processing device controls the information providing device to perform a position presentation control.

The number of users 1 to whom content is to be provided is not limited, and the present technology is applicable to an arbitrary number of users 1. It is possible to perform various position presentation controls when respective users 1 are a first user.

The case in which an information processing method according to the present technology is performed by a computer such as the content providing device 10, the HMD 200, and the HMD 300 that are manipulated by the user 1, has been described above. However, the information processing method and a program according to the present technology may be performed by a computer manipulated by the user 1 and by another computer that is capable of performing communication through, for example, a network. Further, a content providing system according to the present technology may be built by the computer manipulated by the user 1 and the other computer working in conjunction with each other.

In other words, the information processing method and the program according to the present technology can be performed not only in a computer system constituted of a single computer, but also in a computer system in which plural computers operate in conjunction with one another. Note that, in the present disclosure, a system refers to a set of elements (such as devices and modules (components)), whether or not all of the elements are in a single housing. Thus, a plurality of devices accommodated in separate housings and connected to one another through a network, and a single device in which a plurality of modules is accommodated in a single housing are both systems.

Regarding, for example, a process of acquiring first line-of-sight information (second line-of-sight information) regarding a line of sight of a first user (first user); a process of acquiring specified input information regarding an input performed by at least one of the first and second users; and a process of controlling an information providing device to perform a position presentation control, the performing, by a computer system, the information processing method and the program according to the present technology includes causing a single computer to perform the processes and causing different computers to perform the respective processes. Further, the performing, by a specified computer, the respective processes includes causing another computer to perform a portion of or all of the processes and acquiring a result of it.

In other words, the information processing method and the program according to the present technology are also applicable to a configuration of cloud computing in which a plurality of devices shares tasks of a single function and works collaboratively to perform the single function through a network.

At least two features from among the features according to the present technology described above can also be combined. In other words, various features described in each embodiment may be optionally combined regardless of which embodiment. Further, the various effects described above are not limitative but are merely illustrative, and other effects may be provided.

Note that the present technology may also take the following configurations.
(1) An information processing device including:
a line-of-sight-information acquisition unit that acquires first line-of-sight information that indicates a gaze position of a first user with respect to a specified object;
an input-information acquisition unit that acquires specified input information regarding an input performed by at least one of the first user or a second user; and
a position presentation unit that controls, on the basis of the specified input information, an information providing device to perform a position presentation control for presenting, to the second user, the gaze position of the first user in an invisible state.
(2) The information processing device according to (1), in which
the line-of-sight-information acquisition unit acquires second line-of-sight information that indicates a gaze position of the second user with respect to the specified object,
the input-information acquisition unit acquires, as the specified input information, positional relationship information regarding a positional relationship between the gaze position of the first user and the gaze position of the second user, and
on the basis of the positional relationship information, the position presentation unit controls the information providing device to perform the position presentation control.
(3) The information processing device according to (2), in which
on the basis of the positional relationship information indicating that the gaze position of the first user and the gaze position of the second user are associated with each other, the position presentation unit controls the information providing device to perform the position presentation control.
(4) The information processing device according to (3), in which
on the basis of the positional relationship information indicating that the gaze position of the first user and the gaze position of the second user are moving in a substantially identical direction, the position presentation unit controls the information providing device to perform the position presentation control.
(5) The information processing device according to (3) or (4), in which
on the basis of the positional relationship information indicating that the gaze position of the first user and the gaze position of the second user are moving substantially simultaneously, the position presentation unit controls the information providing device to perform the position presentation control.
(6) The information processing device according to any one of (2) to (5), in which
on the basis of the positional relationship information indicating that a distance between the gaze position of the first user and the gaze position of the second user is not greater than a specified value, the position presentation unit controls the information providing device to perform the position presentation control.
(7) The information processing device according to any one of (1) to (6), in which
the input-information acquisition unit acquires the first line-of-sight information as the specified input information, and on the basis of the specified input information indicating that the gaze position of the first user exists at a specified position in the specified object, the position presentation unit controls the information providing device to perform the position presentation control.
(8) The information processing device according to (7), in which
the specified position in the specified object is an edge portion of the specified object.
(9) The information processing device according to (7) or (8), in which
the specified object is an object that provides specified content, and
the specified position in the specified object is a discontinuation position of the specified content at which the first user and the second user are gazing.
(10) The information processing device according to (9), in which
the specified content is content whose advancement is at least partially prevented until a specified manipulation is input.
(11) The information processing device according to any one of (1) to (10), in which
the specified object is a playback object that plays back music content or moving content, the input-information acquisition unit acquires the first line-of-sight information as the specified input information, and on the basis of the specified input information indicating that the gaze position of the first user exists on the playback object, the position presentation unit controls the information providing device to perform the position presentation control.

(12) The information processing device according to (11), in which the input-information acquisition unit acquires, as the specified input information, the first line-of-sight information in a section of the music content or the moving content, and on the basis of the specified input information indicating that the gaze position of the first user in the section of the music content or the moving content exists on the playback object, the position presentation unit controls the information providing device to perform the position presentation control.

(13) The information processing device according to any one of (1) to (12), in which the input-information acquisition unit acquires the first line-of-sight information as the specified input information, and on the basis of the specified input information indicating that the gaze position of the first user has moved to the second user, the position presentation unit controls the information providing device to perform the position presentation control for visualizing the gaze position of the first user before the movement.

(14) The information processing device according to any one of (1) to (13), in which the input-information acquisition unit acquires, as the specified input information, sound information regarding sound due to at least one of the first user or the second user, and on the basis of the sound information, the position presentation unit controls the information providing device to perform the position presentation control.

(15) The information processing device according to (14), in which on the basis of the sound information including a demonstrative uttered by the first user, the position presentation unit controls the information providing device to perform the position presentation control.

(1) The information processing device according to any one of (1) to (15), in which the input-information acquisition unit acquires, as the specified input information, gesture information regarding a gesture of at least one of the first user or the second user, and on the basis of the gesture information, the position presentation unit controls the information providing device to perform the position presentation control.

(17) The information processing device according to any one of (1) to (16), in which the information providing device has at least one of an image display function or a sound output function.

(18) The information processing device according to any one of (1) to (17), in which the information providing device is capable of displaying at least one of a virtual-reality image or an augmented-reality image.

(19) A computer-readable recording medium that has stored therein a program that causes a computer system to perform a process including:

acquiring first line-of-sight information that indicates a gaze position of a first user with respect to a specified object;

acquiring specified input information regarding an input performed by at least one of the first user or a second user; and controlling, on the basis of the specified input information, an information providing device to perform a position presentation control for presenting, to the second user, the gaze position of the first user in an invisible state.

REFERENCE SIGNS LIST

E, Ea, Eb gaze position
1, 1a, 1b user
10 content providing device
20 controller
21 input-information determination unit
22 position-presentation control unit
23 line-of-sight detector
24 behavior detector
25 sound determination unit
40 electronic book
42 page
43 viewed-page indicating region
44, 45 pointer
47 icon
48 icon region
50 remote controller
200, 300 HMD

The invention claimed is:

1. An information processing device, comprising:
a central processing unit (CPU) configured to:
acquire first line-of-sight information that indicates a first gaze position of a first user with respect to a specified object;
acquire second line-of-sight information that indicates a gaze position of a second user with respect to the specified object;
acquire positional relationship information that indicates a distance between the first gaze position of the first user and the gaze position of the second user;
determine the first gaze position of the first user and the gaze position of the second user are on a specified region of the specified object for a period of time greater than a first value,
wherein the first value is based on the distance between the first gaze position of the first user and the gaze position of the second user; and
control, based on the determination, an information providing device to present the first gaze position of the first user to the second user.

2. The information processing device according to claim 1, wherein the positional relationship information indicates that the first gaze position of the first user is associated with the gaze position of the second user.

3. The information processing device according to claim 2, wherein the positional relationship information indicates that a direction of movement of the first gaze position of the first user and a direction of movement of the gaze position of the second user are identical.

4. The information processing device according to claim 3, wherein the positional relationship information indicates that movement of the first gaze position of the first user is simultaneous with movement of the gaze position of the second user.

5. The information processing device according to claim 1, wherein the positional relationship information indicates that Rape distance between the first gaze position of the first user and the gaze position of the second user is less than or equal to a second.

6. The information processing device according to claim 1, wherein the CPU is further configured to:
   acquire, as specified input information, the first line-of-sight information based on the first gaze position of the first user at a specific position in the specified object; and
   control, based on the specified input information, the information providing device to present the first gaze position of the first user to the second user.

7. The information processing device according to claim 6, wherein the specific position in the specified object is an edge portion of the specified object.

8. The information processing device according to claim 6, wherein
   the specified object is associated with specified content, and
   the specific position in the specified object is a discontinuation position of the specified content.

9. The information processing device according to claim 8, wherein the specified content is content whose advancement is at least partially prevented until a specified manipulation is input.

10. The information processing device according to claim 1, wherein
    the specified object is a playback object that plays back at least one of music content or moving content, and
    the CPU is further configured to:
       acquire, as specified input information, the first line-of-sight information based on the first gaze position of the first user on the playback object; and
       control, based on the specified input information, the information providing device to present the first gaze position of the first user to the second user.

11. The information processing device according to claim 10, wherein the CPU is further configured to control the information providing device to present the first gaze position of the first user to the second user based on the first gaze position of the first user in a section of the at least one of the music content or the moving content on the playback object.

12. The information processing device according to claim 1, wherein the CPU is further configured to:
    acquire, as specified input information, sound information regarding sound associated with at least one of the first user or the second user; and
    control, based on the sound information, the information providing device to present the first gaze position of the first user to the second user.

13. The information processing device according to claim 12, wherein the sound information includes a demonstrative uttered by the first user.

14. The information processing device according to claim 1, wherein the CPU is further configured to:
    acquire, as specified input information, gesture information regarding a gesture of at least one of the first user or the second user; and
    control, based on the gesture information, the information providing device to present the first gaze position of the first user to the second user.

15. The information processing device according to claim 1, wherein the information providing device has at least one of an image display function or a sound output function.

16. The information processing device according to claim 1, wherein the CPU is further configured to control the information providing device to display at least one of a virtual-reality image or an augmented-reality image.

17. The information processing device according to claim 1, wherein the CPU is further configured to:
    acquire, as specified input information, the first line-of-sight information based on movement of the first gaze position of the first user to a second gaze position of the first user,
       wherein the second gaze position of the first user is on the second user; and
    control, based on the specified input information, the information providing device to present the first gaze position of the first user to the second user.

18. An information processing method, comprising:
    in an information processing device:
    acquiring, by a central processing unit (CPU) of the information processing device, first line-of-sight information that indicates a gaze position of a first user with respect to a specified object;
    acquiring, by the CPU, second line-of-sight information that indicates a gaze position of a second user with respect to the specified object;
    acquiring, by the CPU positional relationship information that indicates a distance between the gaze position of the first user and the to a cecond gaze position of the second user;
    determining, by the CPU, the gaze position of the first user and the gaze position of the second user are on a specified region of the specified object for a period of time greater than a specified value,
       wherein the specified value is based on the distance between the gaze position of the first user and the gaze position of the second user; and
    controlling, by the CPU based on the determination, an information providing device to present the gaze position of the first user to the second user.

19. A non-transitory computer-readable medium having stored thereon computer-executable instructions which, when executed by a computer, cause the computer to execute operations, the operations comprising:
    acquiring first line-of-sight information that indicates a gaze position of a first user with respect to a specified object;
    acquiring second line-of-sight information that indicates a gaze position of a second user with respect to the specified object;
    acquiring positional relationship information that indicates a distance between the gaze position of the first user and the gaze position of the second user;
    determining the gaze position of the first user and the gaze position of the second user are on a specified region of the specified object for a period of time greater than a specified value,
       wherein the specified value is based on the distance between the gaze position of the first user and the gaze position of the second user; and
    controlling, based on the determination, an information providing device to present the gaze position of the first user to the second user.

* * * * *